United States Patent [19]

Jost et al.

[11] Patent Number: 5,834,613
[45] Date of Patent: Nov. 10, 1998

[54] PERHALOGENATED POLYORGANOSILOXANES AND THE PROCESSES FOR THEIR PREPARATION

[75] Inventors: Philippe Jost, Taluyers; Philippe Karrer, Lyon; Gérard Mignani, Lyons; Philippe Olier, Lyons, all of France

[73] Assignee: Rhone-Poulenc Chimie, Courbevoie Cedex, France

[21] Appl. No.: 686,400

[22] Filed: Jul. 25, 1996

[30] Foreign Application Priority Data

Jul. 25, 1995 [FR] France ................... 95 09269

[51] Int. Cl.$^6$ .................. C07F 7/08; C07F 7/10
[52] U.S. Cl. .............. 554/437; 556/440; 556/419; 556/422; 556/425; 556/460; 556/461; 556/453; 556/456; 106/13; 106/287.13; 106/287.11; 106/287.14; 252/358; 508/204; 508/206
[58] Field of Search ............... 556/437, 440, 556/419, 427, 422, 425, 460, 461, 453, 456; 106/13, 287.13, 287.11, 287.14; 252/358; 508/204, 206

[56] References Cited

U.S. PATENT DOCUMENTS

| 5,233,071 | 8/1993 | Wilczek | 556/479 |
| 5,338,877 | 8/1994 | Sawada et al. | 556/440 |

FOREIGN PATENT DOCUMENTS

| 0 246 913 | 11/1987 | European Pat. Off. . |
| 2 483 437 | 12/1981 | France . |
| 42 40 274 A1 | 6/1994 | Germany . |

OTHER PUBLICATIONS

French Search Report, Apr. 15, 1996.

*Primary Examiner*—Paul F. Shaver
*Attorney, Agent, or Firm*—Burns, Doane, Swecker & Mathis, L.L.P.

[57] ABSTRACT

Chemically stable, perfluorinated, linear or cyclic polyorganosiloxanes (POS), and a process for the preparation thereof. Antifoams, agents for lowering surface tension, dirt repellents, antiadhesives, lubricants, oleophobic and/or hydrophobic agents, coatings and other compositions containing the perfluorinated POS are disclosed.

32 Claims, No Drawings

PERHALOGENATED POLYORGANOSILOXANES AND THE PROCESSES FOR THEIR PREPARATION

FIELD OF THE INVENTION

The invention relates to (per)halogenated polyorganosiloxanes (POS) derived from (per)halogenated olefins (e.g. α-olefins) and methods for preparation thereof. The methods include a hydrosilylation reaction, it also being possible to present said reaction as the addition of a hydrogenated silicon compound onto a halogenated reactant having one or more ethylenic or alkynylic units of unsaturation.

DESCRIPTION OF PRIOR ART

It is known that the effects of fluorination, and more precisely of the introduction of perfluorinated units into polymers, are to lower the surface energies, to improve the thermal and chemical stability and to impart organophobicity and oleophobicity properties.

This type of functionalization by halogenation, and in particular by perfluorination, has been applied to silicone polymers, particularly of the cyclic or non-cyclic polyorganosiloxane type, since the 1970s.

Silicone oils grafted by fluorinated units are thus available which have applications in the textile field as stain or dirt repellents or which can be used as lubricants, as anti-adhesives specific for certain adhesives (silicones of high adhesive strength), as fat repellents or else as antifoams. Fluorinated silicone fluids can also be formulated with different thickeners to form mastics or any other sealing and/or jointing materials.

In crosslinked form these fluorinated silicones can be shaped into a variety of engineering parts by molding or extrusion.

For further details on these fluorinated silicones, reference may be made to an article by OGDEN R. PIERCE entitled "Fluorosilicones"—1970—John Wiley & Sons Inc., pages 1 to 15.

A first known strategy for the industrial synthesis of silicones containing perfluorinated units includes "hydrosilylating" a dihalogenohydrogenoorganosilane, such as MeHSiCl$_2$ (Me=methyl), with an unsaturated compound carrying a perfluorinated unit and having the general formula CH$_2$=CH—Rf (Rf=perfluorinated unit). The addition of the silane onto this olefin yields a perfluorinated dihalogenoorganosilane, which can be hydrolyzed to produce a functionalized silicone; this can be a cyclic tetramer, for example. It is possible to subject the latter to a redistribution reaction to give a perfluorinated linear polyorganosiloxane (POS). The hydrosilylation reactions which are involved in this kind of synthesis, and which use various combinations of silicone hybrids and perfluorinated olefins, are known to be catalyzed by selected metal compounds, particularly certain group VIII metals such as platinum. Pt/Sn complexes have thus been employed as hydrosilylation catalysts See U.S. Pat. No. 4,089,882 (SHINETSU). This synthetic strategy appears to be relatively complex and hence expensive.

With a view to industrial simplification, a second synthetic strategy has been proposed which is based on the direct hydrosilylation of a silicone containing an SiH unit with an α-fluorinated olefin, e.g. of the type CH$_2$=CH—Rf, this perfluorinated unit Rf being attached directly to the olefinic CH by a carbon atom carrying at least one fluorine atom. Here again a variety of group VIII metal catalysts, in particular those based on platinum, are used in this hydrosilylation reaction. It has been found, however, that these catalysts do not afford very high yields. In particular, the conventional industrial hydrosilylation catalysts based on platinum (for example of the KARSTEDT type) are not very efficient. Moreover, it has been observed that substantial amounts of by-product are generated, obviously to the detriment of the perfluorination of the silicones. In these known perfluorinated POS, the radical Rf is joined directly to the Si of the silicone chain. In other words, the linkage in this case corresponds to —CH$_2$—CH$_2$—(CH$_2$)—$_m$ where m=0.

It is these linkages which are used in U.S. Pat. No. 5,233,071. They originate from the hydrosilylation of α-olefins. However, to overcome the deficiencies of the hydrosilylation catalysts used in the prior art, the process described in said patent involves cobalt-based organometallic complexes [(Co$_2$CO$_8$, Co$_2$CO$_6$)(PR$_3$)$_3$, where R=alkyl, aryl]. Such a technical proposal has appeared unsatisfactory because the reaction times obtained are of the order of a few days and it is essential to use a substantial amount of catalyst (1–2%), which is particularly unfavorable in terms of the economics of the process.

One appreciable disadvantage of these cobalt-based complexes is that they catalyze reactions other than hydrosilylation. In particular, they are capable of taking part in polymerization processes involving the rupture of epoxy rings. This lack of specificity is particularly troublesome. Moreover, these are not industrial catalysts.

U.S. Pat. No. 5,348,769 discloses linear or cyclic polyorganosiloxanes comprising siloxy units D substituted by a first perfluorinated functional unit of the formula —R$^3$ZRf, and other siloxy units D carrying a second functional unit of the ether-hydroxyl or alkyl-hydroxyl type. The linkage or bridge joining Si to Rf in the first perfluorinated functional unit consists especially of —(CH$_2$)$_x$Z, where x=2, 3 or 4 and Z=NHCO, NHSO$_2$, O$_2$C, O$_3$S, OCH$_2$CH$_3$, NHCH$_2$CH$_2$ or CH$_2$CHOHCH$_2$. The catalyst used is preferably chloroplatinic acid. This is not one of the simplest techniques as it requires the prior preparation of the perfluoroalkylated olefmic reactant. This considerably lengthens the synthesis times and hence increases the cost of the process.

Apart from these linkages whose precursors are perfluoroalkylated α-olefins of the formula CH$_2$=CH—Rf, the technical literature of the prior art also describes bridges whose olefinic precursors are of the type CH$_2$=CH—L—Rf, the chemical bond between (and Rf being an ester bond. The latter results from the reaction of a carboxyl group with a perhalogenated alcohol, preferably perfluorinated alcohol, and said carboxyl group is generally the hydrolysis product of an acid anhydride.

Thus PCT patent application WO 94/12561 discloses POS grafted by fluorinated units only in the α, and ω positions at the ends of the silicone chains. These POS α,ω-perfluorinated on alkyl ester groups do not exhibit optimum properties in respect of surface tension lowering or oleophobicity and hydrophobicity.

European patent application no. 0 640 644 describes perfluorinated (Rf) silicone derivatives which can be used in cosmetic formulations. These perfluorinated silicone derivatives are characterized by siloxy units D carrying three different types of perfluorinated grafts, namely:

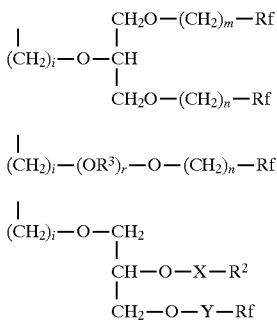

(1)

(2)

(3)

where $R^2$, $R^3$=alkyl, e.g. $CH_3$;

$2 \leq i \leq 16$, e.g. i=3; $1 \leq m,n \leq 6$; $0 \leq r < 50$;

the number of siloxy units D grafted in this way is between 1 and 200; and X, Y=single bond, —CO— or $C_1$–$C_6$-alkylene.

A common feature of these perfluorinated grafts (1) to (3) is the presence of ether bonds within the linkage joining the perfluorinated radical Rf to the silicon. Each of these ether bonds represents a possible point of rupture by chemical attack, under certain conditions.

This is a major disadvantage of these known perfluorinated POS because the labile character of the perfluorinated groups is clearly unacceptable in certain applications.

This review of the prior art shows that there are no chemically stable, halogenated—preferably (per) fluorinated—POS in which the fluorinated, pendent, lateral grafts result from the hydrosilylation of perfluorinated olefins with SiH units and have alkyl and/or alkyl ester linkages but not ether linkages.

Furthermore, the prior art contains even fewer disclosures of such POS which can be obtained in a simple, economic and hence perfectly industrial manner.

SUMMARY OF THE INVENTION

Under these circumstances, one of the essential objects of the present invention is to overcome this deficiency of such halogenated—preferably (per)fluorinated—POS and preferably to provide novel perfluorinated POS possessing bifid grafts each having one or two parallel perfluorinated chains, said POS thus having a crystalline character which makes them particularly suitable for application as dirt repellents.

Another essential object of the invention is to provide a process for the preparation of halogenated—preferably (per) fluorinated—POS, this process being of the type in which at least one halogenated (e.g. fluorinated) olefin is reacted with a POS containing at least one SiH unit, in the presence of an effective amount of catalyst, according to a hydrosilylation mechanism, it being necessary for said process to use available or easily preparable starting materials and also to be based on a methodology which is simple to put into effect, does not require sophisticated equipment and makes it possible to achieve high performance characteristics in terms of the yield and purity of the final perfluorinated POS.

Another essential object of the invention is to offer a perhalogenation (perfluorination) process of the above-mentioned type which is characterized by excellent hydrosilylation kinetics and by a high degree of conversion of the SiH units to SiRoRf units, where Ro=divalent bridge and Rf=perfluorinated unit.

Another essential object of the present invention is to provide a process for the perhalogenation—preferably (per) fluorination—of SiH-carrying POS which allows the use of traditional hydrosilylation catalysts that are simple to manipulate and inexpensive, for example of the platinic type (KARSTEDT), without sacrificing the essential requirements of optimum efficiency, yield, purity of the final products and specificity.

Another essential object of the invention is that the above-mentioned process makes it possible simply and economically to obtain perfluorinated POS (e.g. silicone oils) which are monofunctional.

These and other objects are achieved by the present invention, which relates principally to novel perhalogenated—preferably perfluorinated—POS and to a novel perhalogenation—preferably perfluorination—process by the hydrosilylation of SiH-carrying POS, said process being one of those which makes it possible to obtain the above-mentioned novel POS.

DETAILED DESCRIPTION OF THE PREFERRED EMBODIMENTS OF THE INVENTION

The present invention therefore relates firstly to (per) halogenated—preferably (per)fluorinated—polyorganosiloxanes (POS) comprising species of the following general formulae (I) and (II):

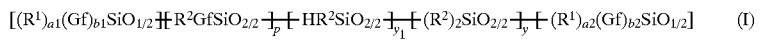

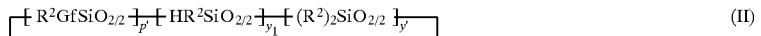

in which:

a1+b1=3, a2+b2=3; a, a2=2 or 3; b1, b2=0 or 1;

$1 \leq p \leq 200$, preferably $1 \leq p \leq 90$;

$0 \leq y_1 \leq 10$, preferably $0 \leq y_1, \leq 5$;

$0 \leq y \leq 100$, preferably $0 \leq y \leq 50$;

where $5 \leq p+y_1+y \leq 200$, preferably $10 \leq p+y_1+y \leq 100$, and $[p/(p+y+y_1 +2)].100 \geq 3$, preferably $\geq 5$;

$1 \leq p' \leq 9$, preferably $1 \leq p' \leq 4.5$;

$0 \leq y'_1 \leq 1$, preferably $0 \leq y'_1 \leq 0.25$;

$0 \leq y' \leq 5$, preferably $0 \leq y' \leq 0.5$;

each radical $R^1$, $R^2$ on the one hand is identical to or different from like radicals of the same exponent and the other radical of different exponent, and on the other hand is a linear or branched $C_1$–$C_{12}$-(cyclo)alkyl—preferably $C_1$–$C_6$-(cyclo)alkyl—group or a hydrocarbon group, advantageously an aryl, an aralkyl or an alkylaryl, these groups optionally being substituted; and Gf:

is an optionally halogenated—preferably (per) fluorinated—functional monovalent radical of identical or different type in the p or p' siloxy units D and/or the two siloxy units M in which it is present, and has the following average formula:

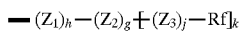 (Gf)

where h=0, 1; g=0, 1; j=0, 1 and k=1 or 2;

Legend: The free valences shown in bold — throughout the present disclosure are those attached directly or indirectly to the silicon of the POS and located closest to said silicon.

with the proviso that at least one radical Gf in which k≠0 is present in said POS (I) or (II);

$Z_1$ being a divalent radical of the formula

where m≥2, with the proviso that if m=2, then at least some of the radicals Gf are radicals in which g≠0, and it optionally being possible for at least one of the hydrogens substituting the carbons of $Z_1$ to be replaced by a linear or branched $C_1$–$C_6$-lower alkyl, preferably by a methyl;

$Z_2$ being a mono-, di- or tri-valent radical of one of the following formulae:

.α.

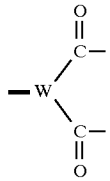

one or both of the free valences of the carbonyl(s) being joined to —$Z_3$Rf and, in the case where only one of said free valences is joined to —$Z_3$Rf, the other then being joined to a hydroxyl;

.β.

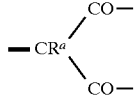

at least one of the free valences of the carbonyls being joined to —$Z_3$—Rf and, in the case where only one of these free valences is joined to —$Z_3$—Rf, the other then being joined to a linear or branched $C_1$–$C_6$-alkoxy; and $R^a$=H, aryl or linear or branched $C_1$–$C_6$-lower alkyl, preferably $CH_3$;

.γ.

.δ.

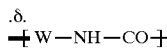

.ε.

-continued

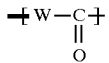

.η.

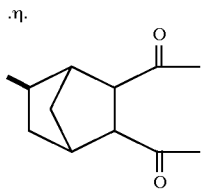

h=0 in Gf;

one or both of the free valences of the carbonyl(s) being joined to —$Z_3$—Rf and, in the case where only one of said free valences is joined to —$Z_3$Rf, the other then being joined to a hydroxyl or to a linear or branched $C_1$–$C_6$-alkoxy;

.θ.

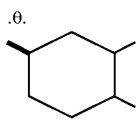

one or both of the two free valences other than the valence — being joined to —$Z_3$—Rf and, in the case where only one of these two valences is joined to —$Z_3$—Rf, the other then being joined to OH or to a linear or branched $C_1$–$C_6$-alkoxy; or

.λ.

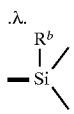

one or both of the two free valences other than the valence — being joined to —$Z_3$—Rf and, in the case where only one of these two valences is joined to —$Z_3$—Rf, the other then being joined to OH or to a linear or branched $C_1$–$C_6$-alkoxy;

$R^b$=H or linear or branched $C_1$–$C_6$-lower alkyl, methyl being preferred;

W being a cyclic or non-cyclic hydrocarbon radical, in particular an aliphatic and/or alkenyl and/or alkynyl and/or aromatic radical, and W also being devoid of an ether link —O—;

$Z_3$ is a divalent radical of the formula

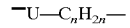

where n≥1 and U=O, S, NH or $NHSO_2$, preferably O; and and Rf being a perhalogenated—preferably perfluorinated—radical and particularly preferably a linear or branched perfluoroalkyl radical having one of the following formulae:

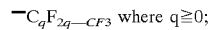

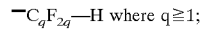

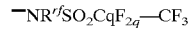

where q≥0 and $R^{rf}$=H, aryl or linear or branched $C_1$–$C_6$-lower alkyl (preferably $CH_3$); and

where $q \geq 1$ and $R^{rf}$ is as defined above.

It is to the credit of the Applicant to have produced these novel (per)halogenated—preferably (per)fluorinated—POS by the careful selection of different species of grafts perfluorinated by Rf, including the following species in particular:

that with an alkylene linkage —$(C_mH_{2m})$— where m>2;

that with an alkylene linkage —$(C_mH_{2m})$— where m=2, which is necessarily associated with at least one other species of linkage in a given POS;

that with an alkylene linkage —$(C_mH_{2m})$—(m>2) extended by a divalent or trivalent hydrocarbon radical W devoid of an ether —O—, and having one or more free carboxyl ends or bonding with perfluorinated radicals Rf, with the proviso that if all the carboxyl ends are free on a given graft, then the POS comprises at least one other perfluorinated graft;

that with an alkylene linkage —$(C_mH_{2m})$—(m>0) extended by W, which itself forms part of is joined to a cyclic unit comprising at least one divalent radical —O—, this unit containing for example:

an acid anhydride
and/or an epoxide
and/or a cyclic ether;

that with an alkylene linkage —$(C_mH_{2m})$—(m>2) extended by W ω-hydroxylated and/or alkoxylated by a radical whose free end is Rf;

that with an alkylene linkage —$(C_mH_{2m})$—(m>0) extended by a divalent or trivalent radical belonging to the general family of the radicals W and joined to or forming part of a cyclic unit whose free valence(s), other than that joined to Si, bonds (bond) with any radical(s) $Z_3Rf$ and/or with alkyl, alkoxy or hydroxyl substituents;

that with an alkylene linkage —$(C_mH_{2m})$—(m>0) extended by a trivalent silyl radical in which the free valences, other than that joined to Si, bond with any radical(s) $Z_3Rf$ and/or with alkyl, alkoxy or hydroxyl substituents; and that with a linkage not containing a divalent alkylene radical but having a radical W directly connected to Si.

These novel POS monofunctionalized by perfluorinated radicals Rf satisfy the condition that at least one radical Gf in which k≠0 is present in the POS (I) or (II).

All the grafts perfluorinated by Rf have the advantage of being chemically stable.

Another major advantage of the grafts Gf according to the invention is that they can be obtained with the aid of industrial catalysts, for example those based on platinum, such as the KARSTEDT catalyst. Apart from the fact that they are used in small amounts, these catalysts are intrinsically economic, thereby contributing to a reduction in the cost of the novel perhalogenated (perfluorinated) silicon compounds according to the invention.

This cost is all the lower because the structure of the graft according to the invention affords rapid hydrosilylation kinetics, high yields and high degrees of conversion of the SiH units to SiGf units.

Preferably, the monovalent radical Rf corresponds to —$C_pF_{2p}$—$CF_3$, where p is between 3 and 20, preferably between 5 and 12 and particularly preferably between 7 and 10. In practice, it is also possible to use, e.g. mixtures of Rf in which p=7, 8 and 9.

According to one advantageous provision of the invention, the perfluorinated polyorganosiloxanes (I) and (II) to which it relates comprise one or more grafts Gf in which:

h=0 or 1 and g=1, $Z_2$ being of the type comprising a group W corresponding to a substituted or unsubstituted, saturated, unsaturated or aromatic monocyclic or polycyclic radical preferably selected from the following rings:

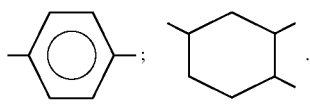

According to one preferred modality of the invention, the POS are linear and have the following formula (I.1):

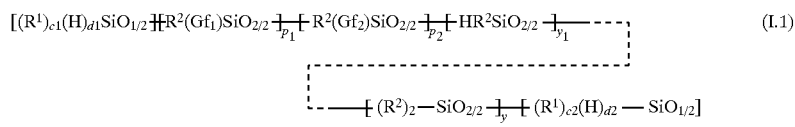

where
$R^1$, $R^2$=methyl, propyl or butyl;
c1+d1=3 and preferably c1=2, d1=1
c2+d2=3 and preferably c2=2, d2=1;
$p_1$, $p_2 \geq 0$; $p_1+p_2 \geq 1$;
$0 \leq y_1 \leq 100$, preferably $0 \leq y_1 50$, with the proviso that if $y_1=0$, then d1 and/or d2=1;
$0 \leq y \leq 500$, preferably $0 \leq y \leq 500$;
$Gf_1$=Gf, where h=k=1 and g=j=0;
$Gf_2$=Gf, where h=g=1, k=1 or 2 and $Z_2$=

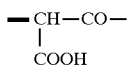

or

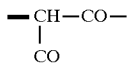

Even more preferably, the POS (I) according to the invention are perfluorinated linear polymers of the following formula (I.1.1):

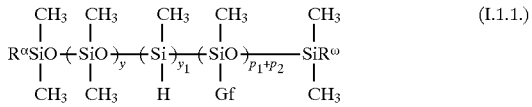

where y, $y_1$, $p_1$, $p_2$ and Gf=$Gf_1$ or Gf, are as defined above and $R^\alpha$ and $R^\omega$, which are identical or different, are H or $C_1$–$C_6$-alkyl.

Advantageously Gf is selected from the following list of groups:

• .a.

-continued

where m≧2, h=1, g=0, j=0 and k=1;
if m=2, then g=1, where W=—(CH$_2$)—$_{t≧1}$, and/or provision is made for at least one other group Gf which is different from Gf$_1$, m preferably being between 2 and 10;

• .b.

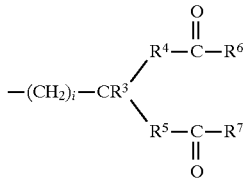

where:
h=1, g=1, j=0 or 1, k=1 and i=2 to 10;
R$^3$=H or C$_1$-C$_6$-alkyl;
R$^4$ and R$^5$ are mutually identical or different and correspond to —(CH$_2$)—$_{u≧0}$; and
R$^6$ and R$^7$ are mutually identical or different and are OH or Z$_3$—Rf, where Z$_3$=—O—(CH$_2$)—$_s$, being between 0 and 10, at least one of the radicals R$^6$ and R$^7$ corresponding to Z$_3$Rf;

• .c.

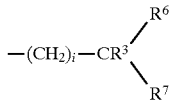

where:
h=1, m≧0, g=1, j=0 or 1, k=1 and i=2 to 10; and
R$^3$, R$^6$ and R$^7$ are as defined above;

• .d.

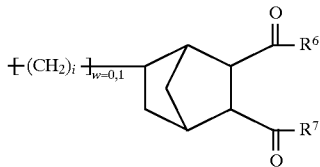

where:
h=0 or 1, m≧0, g1, i=2 to 10, j=1 and k 1; and
R$^6$ and R$^7$ are as defined above;

• .e.

where:
h=1, m≧0, g=1, i=2to 10, j=0 or 1 and k=1; and
R$^6$ is as defined above; and
.f. mixtures thereof.

According to the invention, a subgroup of particular grafts Gf called "bifid grafts" are considered which are very especially preferred for the remarkable characteristics which they are capable of imparting to the POS onto which they are grafted. The invention therefore further relates to POS of the type defined above which comprise at least one species (I) and/or (II) substituted by at least one perhalogenated— preferably perfluorinated—radical Gf selected from the following subgroup of radicals:

→ (i)

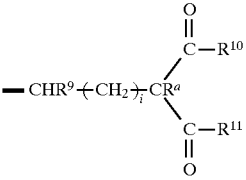

where:
R$^a$ and R$^9$ independently are H or linear or branched C$_1$-C$_6$-lower alkyl, preferably CH$_3$;
R$^{10}$ and R$^{11}$ independently are OH, linear or branched C$_1$-C$_6$-alkoxy or Z$_3$—Rf, at least one of the radicals R$^{10}$ and R$^{11}$ being —Z$_3$Rf; and
i=0 to 10, preferably 0 to 3 and particularly preferably 1;

→ (ii)

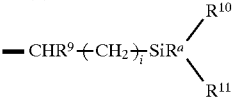

where R$^9$, R$^a$, R$^{10}$, R$^{11}$ and i are as defined above;

→ (iii)

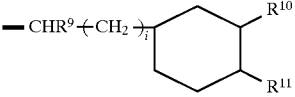

where R$^9$, R$^{10}$, R$^{11}$ and i are as defined above, it optionally being possible for the hexyl ring to be substituted; and mixtures of the above-mentioned radicals.

A particularly interesting species of POS compounds according to the invention is represented by the perhalogenated—preferably perfluorinated—POS carrying bifid grafts Gf as defined above. More precisely, the bifid Gf of interest here are those in which the two lobes each consist of a perhalogenated—perfluorinated—radical Z$_3$Rf. These bisperfluorinated bifid grafts Gf are crystalline and, in particular, impart a degree of crystallinity to the POS which they substitute. This optimizes the water-repelling properties of the latter, which thus make very suitable active products in dirt-repelling compositions, inter alia.

These bifluorinated bifid grafts Gf can be associated especially with monoperfluorinated and/or non-perfluorinated bifid Gf.

The POS of this species comprise at least one species (I) and/or (II) substituted by:
at least one perhalogenated—preferably perfluorinated— radical Gf of formula (i), (ii) or (iii) as defined above, the radicals R$^{10}$ and R$^{11}$ in the formula in question corresponding to Z$_3$Rf and preferably to:

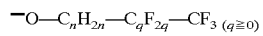

or

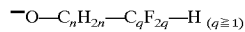

and optionally at least one radical Gf (i), (ii) or (iii) in which one of the radicals R$^{10}$ or R$^{11}$ is Z$_3$Rf and the other radical $R^{10}$ or $R^{11}$ is different from $Z_3Rf$ and advantageously corresponds to OH or linear or branched $C_1$–$C_6$-alkoxy.

During the synthesis, those skilled in the art are perfectly capable of controlling the degrees of substitution of the POS of this species by bisperfluorinated and/or monoperfluorinated and/or non-perfluorinated bifid Gf. It is the intended applications of the grafted POS which determine how these degrees of substitution should be regulated.

Within this species the bifid Gf with an alkylmalonyl linkage (i) are chosen more especially in practice.

All these grafts Gf impart novelty and great technical value to the POS to which they are attached.

On the basis of the details given above in respect of the POS according to the invention and their grafts Gf, it can be deduced that the POS to which the invention relates very specifically, but without implying a limitation, are e.g. poly(dimethyl,methylperfluoroalkyl)siloxanes or poly(methylalkyl, methylperfluoroalkyl)siloxanes where the first allyl group is propyl, butyl, pentyl, hexyl, etc.

The linear perfluorinated POS compounds of average formula (I.1) and (I.1.1) naturally have corresponding cyclic compounds of average formula (II.1) and (II.1.1); in this case, however, the sum of $p'+y'_1+y'$ is less than or equal to 10, preferably 5.

It should be noted that all the POS (I) and (II), in particular (I.1), (I.1.1), (II.1) and (II.1.1) according to the invention, contain at least one graft Gf carrying at least a first perfluorinated radical Rf, and optionally one or more Gf carrying other radicals Rf which are identical to or different from one another and the first radical Rf mentioned above.

It is possible to envisage multiple combinations of grafts Gf on the POS of the invention: Gf with $Z_2$ α to λ and in particular $Gf_a$ to $Gf_e$, Gf(i), Gf(ii) and Gf(iii), these last three grafts being particularly preferred.

According to an optional but nevertheless advantageous provision of the invention, the POS contain, per molecule, at least one siloxy unit

where $R^8$ is defined in the same way as $R^1$, $R^2$ and Gf, as given above, and optionally siloxy units $Q=[SiO_{4/2}]$.

As far as the functional characteristics of the products according to the invention are concerned, it is necessary to emphasize the fact that the monofunctional or polyfunctional fluorinated polyorganosiloxanes described above have notable properties of surface tension lowering and oleophobicity and/or hydrophobicity, inter alia. These properties can be adjusted by controlling the proportions of grafted or non-grafted units D present in the fluorinated POS. This corresponds to the molar proportions p, y, $y_1$ and p', y', $y'_1$ given by formulae (I) and (II) defined above.

It should be noted that m values of 2 or 3 in $Z_1$ guarantee that the fluorinated POS in question will have a good heat stability. This property can be advantageous especially in the context of application as a lubricant.

The fluorinated POS according to the invention can take the form of oils of greater or lesser viscosity, but can also take the form of resins Q and/or resins resulting from the crosslinking of linear or cyclic POS chains via crosslinking functional groups which can be present in said POS.

The invention further relates to a process for the preparation of cyclic or linear halogenated—preferably (per)fluorinated—POS, which consists essentially in reacting:

A→at least one polyalkylhydrogenosiloxane—preferably polymethylhydrogenosiloxane—oil B→with at least one (per)halogenated—preferably (per)fluorinated—olefin which is a precursor of Gf, as defined above and has the formula $Gf_{1p}$:

in which:

$Z_{1p}$=olefinic precursor of $Z_1$,

Rf is as defined above and m>2 in $Z_1$,

C→in the presence of an effective amount of a metal hydrosilylation catalyst preferably based on platinum.

This is a first method—the most direct method—of implanting perfluorinated grafts Gf on a POS chain by hydrosilylation. The grafts obtained are alkyleneperfluoroalkyls.

The olefinic, preferably vinylic, precursors are readily available or easy to obtain.

Throughout the description of the process, the precursor radicals of the radicals present in the final POS are identified by the subscript "p" following the subscript(s) already indicated.

To obtain a novel mixture of POS in the case where m=2 in $Z_{1p}$, it will again be necessary to react the oil A with at least one other olefinic precursor $Z_{1p}$ where m>2, and/or with other precursors of different Gf, as explained below.

Thus, in a second mode of carrying out the process according to the invention, the oil A is reacted:

B'→with at least one (per)halogenated—preferably (per)fluorinated—olefin which is a precursor of $Gf_1$, as defined above, and has the formula $Gf_{1p}$:

in which:

$Z_{1p}$=olefinic precursor of $Z_1$,

Rf is as defined above and m=2 in $Z_1$,

D→with at least one olefin of the formula

in which $Z_{1p}$=olefinic precursor of $Z_1$ and $Z_{2p}$=precursor of $Z_2$,

B→and/or with reactant B as defined above,

C→in the presence of an effective amount of a metal hydrosilylation catalyst preferably based on cobalt and/or platinum, the reaction product A+B'+D and/or B optionally being brought into contact with a reactant E:

E→of the type $Z_{3p}Rf$, where $Z_{3p}$=precursor of $Z_3$ and Rf is as defined above, to form one or more radicals $Gf_2$.

In this second mode, at least one of reactants B and D must be used in order to ensure that the products obtained are novel. In practice this second mode of carrying out the invention is performed in several steps, the hydrosilylation of B' being carried out separately from that of the other olefins B or D. For example, the hydrosilylation of B' is catalyzed by a cobalt-based product whereas the other hydrosilylations are catalyzed by platinum.

In a third mode of carrying out the invention, the oil A is reacted:

D'→with at least one olefin of the formula

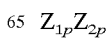

in which:

$Z_{1p}$=olefinic precursor of $Z_1$ and $Z_{2p}$=olefinic precursor of $Z_2$,

C→in the presence of an effective amount of a metal hydrosilylation catalyst preferably based on platinum, the reaction product A+D' optionally being brought into contact with a reactant E'→of the type $Z_{3p}$Rf, where $Z_{3p}$=precursor of $Z_3$ and Rf is as defined above, to form one or more radicals $Gf_2$.

In the second and third modes of carrying out the invention, the grafts Gf are constructed by growing roots of these grafts, these roots being fixed to the POS chains. In a manner of speaking, the constituent elements $Z_1$, $Z_2$, $Z_3$ and Rf are butted together.

By contrast, in the fourth mode of carrying out the invention, a global precursor of Gf, i. e. $Gf_p$, is prefabricated and then fixed to the POS.

In other words, this consists essentially in reacting:

A→at least one polyalkylhydrogenosiloxane—preferably polymethyl—hydrogenosiloxane—oil F→with at least one halogenated—preferably (per) fluorinated—olefin which is a precursor of Gf and has the formula ($Gf_p$):

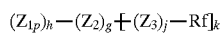

in which:

$Z_{1p}$ is the olefinic precursor of the radical $Z_1$, as defined above, and $Z_2$, $Z_3$, Rf, h, g, j and k are also as defined above, with the provisos that:

if h=0, then g=1 and $Z_2$ becomes an olefinic precursor $Z_{2p}$, if k=h=1 and m=2, then g=1 and $Z_2$=$Z_{2p}$, C→in the presence of an effective amount of a metal hydrosilylation catalyst preferably based on platinum.

The precursor $Gf_p$ of Gf preferably has one of the following formulae:

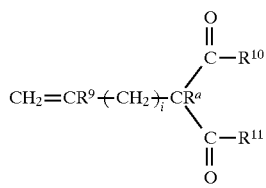

where:

$R^a$ and $R^9$ independently are H or linear or branched $C_1$–$C_6$-lower alkyl, preferably $CH_3$;

$R^{10}$ and $R^{11}$ independently are OH, linear or branched $C_1$–$C_6$-alkoxy or $Z_3$—Rf, at least one of the radicals $R^{10}$ and $R^{11}$ being $Z_3$Rf; and i=0 to 10, preferably 0 to 3 and particularly preferably 1;

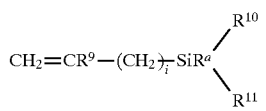

where $R^9$, $R^a$, $R^{10}$, $R^{11}$ and i are as defined above; and

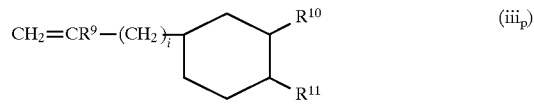

where $R^9$, $R^{10}$, $R^{11}$ and $R^i$ are as defined above, it optionally being possible for the hexyl ring to be substituted.

These olefinic precursors $Gf_p$ of the grafts Gf have one or two perfluorinated groups $R^{10}$, $R^{11}$ ($R^{10}$ and/or $R^{11}$=$Z_3$Rf) and are obtained by reacting:

at least one compound with a mobile hydrogen, consisting of the hydrogenated radical $Z_3$Rf, i.e. H—$Z_3$Rf, as defined above, preferably an alcohol or a thiol, with starting materials formed by compounds of formula ($i_p$), ($ii_p$) or ($iii_p$), as defined above, in which at least one of the radicals $R^{10}$ and $R^{11}$ is a linear or branched $C_1$–$C_6$-alkoxy, according to a transesterification mechanism.

It should be noted that the olefinic precursors $Gf_p$ ($i_p$), ($ii_p$) and ($iii_p$) referred to above constitute novel reaction intermediates (novel synthons).

It follows that the present invention further relates to a reaction intermediate (synthon) capable of being used especially in the process described above and having at least one of the following formulae:

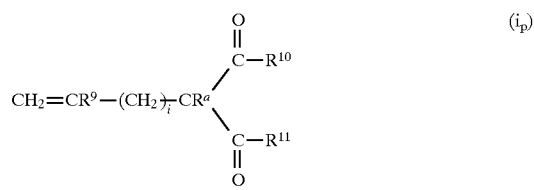

where $R^a$ and $R^9$ independently are H or linear or branched $C_1$–$C_6$-lower alkyl, preferably $CH_3$; and at least one of the radicals $R^{10}$ and $R^{11}$ corresponds to a linear or branched $C_1$–$C_6$-alkoxy, methoxy, ethoxy and propoxy being preferred;

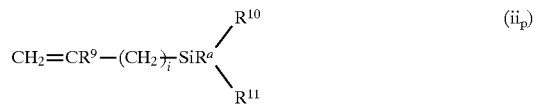

where $R^9$, $R^a$, $R^{10}$, $R^{11}$ and i are as defined above; and

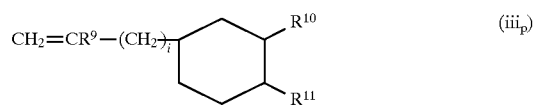

where $R^9$, $R^{10}$, $R^{11}$ and i are as defined above, it optionally being possible for the hexyl ring to be substituted.

One of the major advantages resulting from the use of unsaturated and perfluorinated precursor compounds $Gf_p$ of this type lies in the possibility of using an industrial catalyst selected from compounds based on Ni, Pd or Pt, preferably based on Pt. This can be a KARSTEDT catalyst, for example, which is advantageously employed in small amounts, e.g. of the order of 10 to 50 ppm, relative to the POS compound in question, before hydrosilylation (Si—H oil).

The methodology determined by the process according to the invention is particularly simple. The hydrosilylation kinetics are rapid. The yield and the degree of conversion of the SiH are particularly high. The process is efficient and economic.

According to a preferred modality of the invention, the POS with ≡SiH units is gradually brought into contact with one or more perhalogenated or non-perhalogenated olefins $Gf_p$, the catalyst being contained in one or both of these two constituents POS and $Gf_p$ of the reaction medium. This applies in particular to the perfluorinated olefinic alkylene and the perfluorinated olefinic alkylene-acid anhydride.

The hydrosilylation conditions selected for the process according to the invention are conventional and can therefore be determined easily by those skilled in the art.

In practice the hydrosilylation takes place in as many stages as there are different olefinic reactants.

The reaction medium is stirred and heated to a temperature between 50° and 150° C. The reaction takes place at atmospheric pressure and generally over a period of several hours. The degree of conversion of the SiH units is greater than 99% by number.

In the case where Gf of the anhydride type are involved, it is possible to envisage hydrolyzing at least some of these anhydride groups so as to generate free carboxyl ends, and then esterifying at least some of said carboxyl ends with reactants of the type $Z_{3p}$—Rf, $Z_{3p}$ being a hydrogenated precursor of $Z_3$, as defined above, and Rf also being as defined above.

As regards the other functional groups of the prelinkage type Rf which have been described above and which can be carried by the silicons of the POS according to the invention, they can be grafted before, during or after the grafting of the alkylene radicals perfluorinated by Rf.

The following may be mentioned as examples of the POS which can be used as starting materials for the process according to the invention:

linear POS such as polymethylhydrogenosiloxanes, especially those of the type:

$$Me_3SiO(SiMeHO)_eSiMe_3,$$

where e=10 to 100, preferably 50;

$$or\ Me_3SiO(SiMeHO)_{e1}(SiMe_2O)_{e2}SiMe_3,$$

where e1=10 to 100 and e2=0 to 50; and
cyclic POS such as the tetramethyltetracyclosiloxane D'4.

The following may be mentioned as examples of POS which are capable of being perhalogenated—preferably perfluorinated—by using the process according to the invention:

$$Me_3SiO(SiMe_2O)—_8(SiHMeO)—_4SiMe_3$$

$$Me_3SiO(SiMeHO)—_{50}SiMe_3$$

The POS according to the invention can take the form of pure oils or else aqueous emulsions.

Thus the invention further relates to an aqueous emulsion which contains:

at least one POS obtained by the process as defined above;

water; and at least one surfactant.

According to yet another of its features, the invention relates to:

the application of the perhalogenated (perfluorinated) silicon compounds per se, as described above, or those obtained by the perhalogenation process disclosed above, as:

lubricants agents for lowering surface tension dirt repellents antiadhesives antifoams oleophobic and/or hydrophobic agents and raw materials for the production of elastomers or films for resisting chemical attack and solvents; and a film and/or coating possessing at least one of the above-mentioned properties.

Finally the invention further relates to a dirt-repelling composition comprising:

at least one POS obtained by the process as defined above, and/or at least one emulsion as defined above, said POS used preferably carrying:

grafts bifunctionalized by perhalogenated— perfluorinated—radicals as defined above, optionally grafts monofunctionalized by perhalogenated—perfluorinated—radicals also as defined above, and optionally other grafts functionalized by groups other than bis- or mono- perhalogenated— perfluorinated—groups.

EXAMPLES

EXAMPLE I

SYNTHESIS OF SILICONES GRAFTED WITH PERFLUORINATED UNITS—CATALYSIS WITH COBALT 20 g (0.058 mol of Si—H units) of the following resin:

$$(MeHSiO)_{0.5}(MeSiO_{3/2})_{0.5}(O_{1/2}Et)_2$$

in which the molar ratios are D'/T=1 and Si—O—Et/Si=2 and the functionality is 288.5 meq/100 g of resin, 33.1 g (0.074 mol, 30 mol % excess) or propenyl-$C_8F_{17}$ and 0.2734 g (0.0008 mol, 0.5 wt. %/resin) of $Co_2CO_8$ are introduced into a 100 ml reactor under nitrogen.

The medium is homogeneous. It is heated to 47° C. in a bath. Exothermicity is observed and the temperature of the reaction mixture reaches 80° C. The reaction is allowed to proceed for 30 min. The degree of conversion of the Si—H units is of the order of 98%. After 16 h of reaction at 45° C, the degree of conversion of the Si—H units is quantitative. The mixture is allowed to return to room temperature and 150 ml of methanol are added. There is no evolution of CO coming from the catalyst. 5 washes are carried out with methanol. The functionalized resin is soluble in methanol. After devolatilization (90° C., 1 h, 6 mm Hg), 16 g of a resin are recovered. The extraction residue is solubilized in trichlorotrifluoroethane. The mixture of devolatilized resin and residue is filtered to give a yellowish liquid, which yields 20 g of a clear, light yellow resin on devolatilization.

EXAMPLE II

SYNTHESIS OF SILICONES CONTAINING PERFLUORINATED UNITS $Gf_1$ WHERE m>2/ CATALYSIS BY ORGANOMETALLIC PLATINUM COMPLEXES

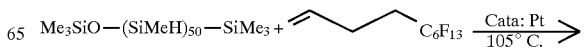

-continued

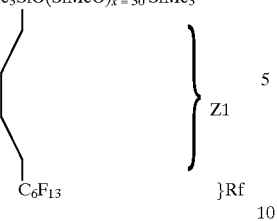

177.9 g (0.47 mol, 20% molar excess/Si—H units) of CH$_2$=CH—(CH)$_2$—C$_6$F$_{13}$ (4-perfluorohexylbut-1-ene), i.e. Gf$_1$ where m=4 in Z$_1$, 10.5 μl of a KARSTEDT catalyst (11.9 wt. %) and 12 mg of sodium acetate (Aldrich, 99.995% pure) are introduced into a reactor. The mixture is stirred at 370 rpm. It is heated to 110° C. and 25 g of a silicone oil containing Si—H units of the type RHODORSIL® H68 (RHONE POULENC), corresponding to an α,ω-(trimethylsiloxy)polymethylhydrogenosiloxane oil=MeSiO (SiMeHO)$_{50}$SiMe$_3$, containing 0.015 eq of SiH per gram of H68 and having the formula Me$_3$SiO(SiOMeH)$_{50}$—SiMe$_3$, are run in over 1 h 20 min. When the introduction has ended, the degree of conversion of the Si—H units is >99%. After 3 h of reaction the degree of conversion of the Si—H units is >99.5%. IR analysis shows that Si—H units are no longer present. The reaction mixture is constantly homogeneous throughout the hydrosilylation reaction. 168.2 g of a light yellowish oil are recovered by devolatilization at 100° C. under 1 mm Hg. The amount of volatile material is 32 g. The structure of this oil is confirmed my structural analyses.

Example III

The same process as that described in Example no. II is used, but the operating conditions are slightly changed (introduction of the Si—H fluid in 60 minutes, reaction temperature and time: 80° C. and 6 hours) and the following reactants and amounts are used:

10 mg of sodium acetate 80 g (0.214 mol) of 4-perfluorohexylbut-1-ene (Gf$_1$, m=2 in Z$_1$)

130 microliters of a 1% (w/w) solution of KARSTEDT platinum 50 g (0.105 eq of Si—H) of an oil of the structure Me$_3$SiO(SiMeHO)$_8$(SiMe$_2$O)$_{42}$SiMe$_3$ 82.2 g of an oil of the structure

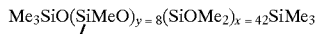
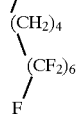

are obtained after devolatilization.

Example IV

The same process as that described in Example no. II is used, but the operating conditions are slightly changed (introduction of the Si—H fluid in 15 minutes, reaction temperature and time: 95° C. and 3 h 20 min) and the following reactants and amounts are used:

16.5 g (0.044 mol) of 4-perfluorohexylbut-1-ene (Gf$_1$, m=2 in Z$_1$)

11 microliters of a 13.6% (w/w) solution of KARSTEDT platinum 33.7 g (0.04 eq of Si—H) of an oil of the structure Me$_3$SiO(SiMeHO)$_4$(SiMe$_2$O)$_{46}$SiMe$_3$ 42.3 g of an oil of the structure

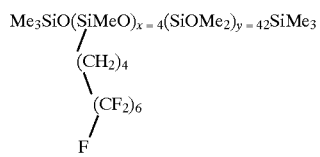

are obtained after devolatilization.

Example V

PROPERTIES OF THE PERFLUORINATED POS ACCORDING TO THE INVENTION IN RESPECT OF SURFACE ENERGY LOWERING

The surface energies γ$_L$ of the oils according to Examples II to IV and of a POS of the polydimethylsiloxane (PDMS) type are collated in Table 1 below (c=4 and d=6):

TABLE 1

| Oil | x | y | γ$_L$ (mN/m) |
|---|---|---|---|
| Example II | 50 | 0 | 19.6 |
| Example III | 8 | 42 | 18.2 |
| Example IV | 4 | 46 | 18.9 |
| PDMS | 0 | 50 | 21 |

By way of comparison, the surface energies of polytrifluoropropylmethylsiloxane measured under the same conditions are 24.2 mN/m for FL 100 SHINETSU and 23.7 mN/m for FS 1265 DOW CORNING.

This ability to lower surface energies opens up avenues for the perfluorinated POS according to the invention as active ingredients in antifoams, lubricants, mold release agents and antiadhesives (paper or the like and concrete or stone).

Each liquid has a corresponding number and the perfluorinated oil is assigned a grade corresponding to the liquid of highest number which remains on the surface of the mat for at least 30 seconds.

Treatment of the mat:

The oil KP 307 is deposited in different amounts on a polyamide-6 mat from a solution in 1,1,2-trifluorotrichloroethane; the mat is first placed in an oven for 14 hours at 30° C. and then placed in an oven for 6 minutes at 80° C. and 4 minutes at 140° C.

TABLE 2

| Amount of fluorine/ PA 6 (ppm) | t with liquid no. 1 (seconds) | t with liquid no. 2 (seconds) | t with liquid no. 3 (seconds) | t with liquid no. 4 (seconds) | t with liquid no. 5 (seconds) |
|---|---|---|---|---|---|
| 700 | >50 | >50 | 1 | 1 | 1 |
| 1400 | >50 | >50 | 39 | 1 | 1 |
| 2800 | >50 | >50 | >50 | 36 | 1 |
| 4200 | >50 | >50 | >50 | 17 | 2 |
| 5600 | >50 | >50 | >50 | >50 | 7 |
| 7000 | >50 | >50 | >50 | >50 | 7 |

The compositions of the standard grading liquids used are as follows:

liquid 1: NUJOL (liquid paraffin)

liquid 2: NUJOL/n-hexadecane, 65/35 by volume, at 21° C.

liquid 3: n-hexadecane liquid 4: n-tetradecane liquid 5: n-dodecane

Thus the oil of VI.1 has corresponding grades of 2 at 700 ppm of fluorine, 3 at 1400 and 4200 ppm of fluorine and 4 at 2800, 5600 and 7000 ppm of fluorine.

Example VI 87.6 g of allylsuccinic anhydride (i.e. 0.626 mol) are introduced into a four-necked 500 ml reactor provided with a central mechanical stirrer, a thermometer, a vertical bulb condenser and a septum.

The medium is stirred, rendered inert with nitrogen and heated to a temperature of 90° C. and 30 μl (i.e. 20 ppm/weight of Si—H oil) of a divinyltetramethyldisiloxane solution of a platinum complex containing 9.5% by weight of platinum with a divinyltetramethyldisiloxane ligand (Karstedt catalyst) are then introduced.

140 g (i.e. 0.525 eq of Si—H) of a poly(dimethyl, methylhydrogenosiloxane) oil are then run in over 3 h 45 minutes, the characteristics of said oil being as follows:

Mn=1364 g 0.375 eq of Si—H per 100 g of oil average structure:

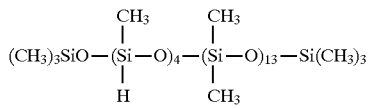

7 h after the start of the reaction, the degree of conversion of the Si—H groups is 99.3%; a devolatilization under vacuum (130° C. for 6 hours under 0.05 mbar) is then carried out to remove the excess allylsuccinic anhydride and give 210 g of an oil of the structure

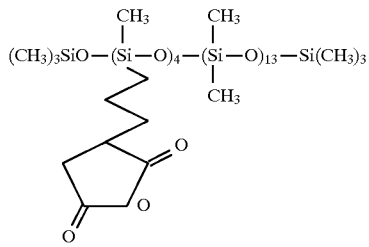

The following are introduced into a four-necked 250 ml reactor provided with a central mechanical stirrer, a thermometer, a vertical bulb condenser and a septum:

43.5 g of the previous oil, i.e. 0.1056 eq of anhydride groups, 54.1 g of 1-perfluorooctyl-2-hydroxyethane, $C_8F_{17}CH_2CH_2OH$ (i.e. 0.1166 mol), 36.6 g of toluene and 0.65 g of triethylamine.

The medium is stirred, rendered inert with nitrogen and heated at a temperature of 70° C. for 3 h. A devolatilization under vacuum (130° C. for 5 h under 2 mbar) is then carried out to remove the toluene, triethylamine and excess 1-perfluorooctyl-2-hydroxyethane and give 83.85 g of an oil of the structure

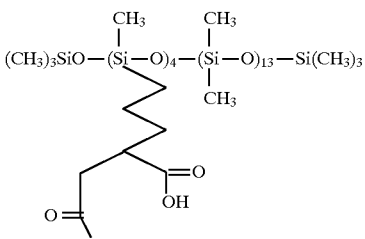

Gf

Example VII

SYNTHESIS OF MONO- AND BIS-PERFLUOROALKYL MONOMERS WHICH ARE PRECURSORS $Gf_p$ OF BIFID GRAFTS Gf

Reaction

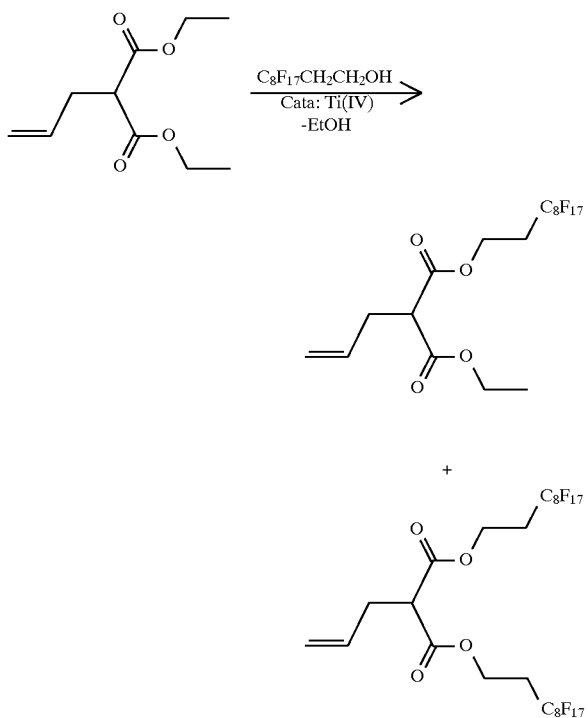

2018 g (10.09 mol) of diethyl allylmalonate, 2340 g (5.04 mol) of the alcohol $C_8F_{17}CH_2CH_2OH$, 3.8 g (0.016 mol) of $Ti(OEt)_4$ and 1000 g of dry toluene are introduced into a 5 l reactor under nitrogen. The temperature in the reaction mixture is raised to 95° C. and the reaction takes place under partial vacuum (≈500 mm Hg) to favor elimination of the ethanol. After 5 h of reaction, a further 7.3 g (0.032 mol) of $Ti(OEt)_4$ are added. The reaction is left to proceed for 120 h. Analysis by gas chromatography indicates that the degree of conversion of the perfluorinated alcohol is 100%. 60 g of neutral alumina (50–200 μm) are added and the mixture is filtered on board. The light materials are devolatilized under a pump vacuum (5 mm Hg, 3 h 40 min).

A vacuum distillation is then carried out to separate the two mono- and bis-perfluoroalkyl monomers.

| Compound | Results/Purity/Characteristics |
|---|---|
| 1) [structure with O(CH₂)₈F₁₇ and OC₂H₆ groups] | 716 g<br>>97.5%<br>95° C./0.05 mm Hg |
| 2) [structure with two O(CH₂)₈F₁₇ groups] | 760 g<br>>97%<br>White solid, m.p. = 38° C. |

IR and NMR analyses confirm the structure of these two monomers.

Example VIII

SYNTHESIS OF POS SUBSTITUTED BY MONOPERFLUORINATED BIFID GRAFTS Gf 20 g of dry toluene, 2.15 μl of a KARSTEDT catalyst (11.5% of Pt) and 42 g (61.7 meq) of monomer (1) containing monoperfluoroalkyl units of Example VII are introduced into a 250 ml reactor under nitrogen. The reaction mixture is heated to 91°–93° C. 4.76 g (53.6 meq of Si—H units) of a silicone oil containing Si—H units of the structure Me₃SiO(SiMe₂O)₂₅(SiMeHO)₇₀SiMe₃ are then run in. The introduction time is 45 min. The degree of conversion of the Si—H units is 99% after 48 h. This silicone oil is devolatilized at 130° C. under 2 mbar for 2 h. 43.6 g of a clear oil are recovered. IR and NMR analyses confirm the structure of this silicone oil.

The Mn of this oil is 49,500 and the % of fluorine is 45.7.

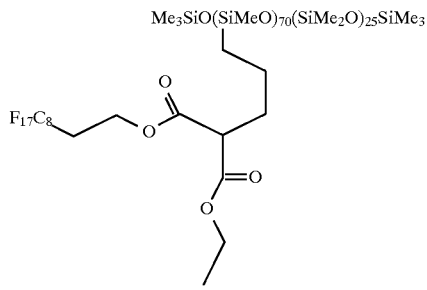

Example IX

SYNTHESIS OF POS SUBSTITUTED BY BISPERFLUORINATED BIFID GRAFTS Gf 86 g of dry toluene and 3 μl of a KARSTEDT catalyst (11.5% of Pt) are introduced into a 250 ml reactor under nitrogen. This reaction mixture is heated to 90° C. A mixture consisting of 435.6 g of bisperfluorinated monomer (2) described in Example VII and 80 g of a silicone oil containing Si—H units of the structure Me₃SiO(SiMeHO)₅₀SiMe₃ (1268 meq of Si—H units) is then run in over 2 h 30 min. The reaction is allowed to proceed for 12 h at 90° C. The degree of conversion of the Si—H units is 34.4%. The mixture is filtered on board at 90° C. to give a colorless liquid, which is devolatilized at 110° C. under 1 mm Hg for 3 h 30 min. 485.4 g of a white solid melting at 58° C. are recovered. IR and NMR analyses confirm the structure of this silicone oil.

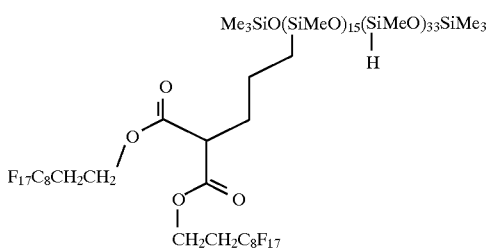

Example X

DETERMINATION OF THE DEGREE OF CRYSTALLINITY

The degree of crystallinity measured by X-rays on monomer (2) of Example VII (precursor $Gf_p$ of bisperfluorinated bifid grafts Gf) is given below.

These results show the organization resulting from the particular crystal structure of said monomer.

Differential thermal analysis performed on the same product also shows a crystallization peak.

| Structure | Degree of crystallinity/Crystallization temperature |
|---|---|
| [structure with two C₈F₁₇ groups] | 68.9% (on sample as such at room temperature)<br>36° C. (maximum of the crystallization peak) |

Example XI

PRODUCTION OF AN AQUEOUS EMULSION FROM THE POS CARRYING MONOPERFLUORINATED BIFID GRAFTS Gf (1) OF EXAMPLE VIII

XI.1 Preparation

The following ingredients are mixed:

POS of Example VIII: 2.5 g

AD33: 0.2 g

Imbentin 33: 0.05 g

Butyl digol: 0.05 g

BRIJ 72: 0.5 g

Water is added gradually and the ingredients are mixed by hand. A further 5.6 g of H₂O are then added and the ingredients are emulsified using a SILVERSTON mixer.

A white emulsion (dry extract=37%) is obtained.

AD33 (SEPPIC): ethoxylated nonylphenol with SO₃ groups

BRIJ 72 (ICI): ethoxylated stearyl alcohol (2 EO)

GENAPOL X 080 (HOECHST): C₁₃ fatty alcohol with 8 EO

XI.2 Application

Two series of tests are performed:

application in a solvent

Deposition of 700 ppm of fluorine (impregnation of a 15 g disk of polyamide (PA) mat) from solutions diluted to 1% in trichlorotrifluoroethane.

Drying for 6 minutes at 80° C., followed by heat treatment for 4 minutes at 140° C.

application in an emulsion

Deposition of 700 ppm of fluorine (application with a gun to a 15 g disk of PA mat) from the emulsions described above.

Drying for 6 minutes at 80° C., followed by heat treatment for 4 minutes at 140° C.

The hydrophobicity and oleophobicity properties are evaluated by the penetration or non-penetration of liquids of decreasing surface tension (on three drops of liquid).

The POS is assigned the number corresponding to the liquid of lowest surface tension which does not penetrate after 30 seconds in the oleophobicity test and after 3 minutes in the hydrophobicity test.

TABLE 3

| Hydrophobicity index | Composition: isopropanol/$H_2O$ |
|---|---|
| 0 | 0/100 |
| 1 | 10/90 |
| 2 | 20/80 |
| 3 | 30/70 |
| 4 | 40/60 |
| 5 | 50/50 |
| 6 | 60/40 |
| 7 | 70/30 |
| 8 | 80/20 |
| 9 | 90/10 |
| 10 | 100/0 |

TABLE 4

| AATCC oleophobicity index | Composition |
|---|---|
| 1 | Nujol |
| 2 | Nujol (65)/n-hexadecane (35) |
| 3 | n-hexadecane |
| 4 | n-tetradecane |
| 5 | n-dodecane |
| 6 | n-decane |
| 7 | n-octane |
| 8 | n-heptane |

The compositions are given by volume at 20° C.

XI.3 Results

TABLE 5

| | Oleophobicity index | Hydrophobicity index |
|---|---|---|
| POS VIII (solvent) | 4 | 1 |
| POS VIII (emulsion) | 4 | 2 |

Example XII

PHYSICOCHEMICAL STUDY OF THE POS CARRYING MONOPERFLUORINATED BIFID GRAFTS Gf (1) OF EXAMPLE VIII

XII.1 Wetting of the deposits

The utility as a "dirt repellent" in terms of physicochemical properties can be summed up by the behavior of the deposit towards liquids (wetting) and its stability over time in contact with a liquid.

XII.1.1 Methodology of the study

The following simple physicochemical study is carried out:

1* Deposition of the treatment polymer by plate whirler from 0.25% solutions of polymer. FC 396 (perfluorinated polyacrylate) (Scotchgard®), a reference treatment, was also studied.

6 families of samples are studied on this basis—the sample "as such" or initial sample and a sample baked at 140° C. for 4 min. These 2 samples are then taken and subjected to:

either a "leaching" test consisting in allowing drops of water to fall from a height of 1 meter for 10 min (initial and washed, baked and washed), or an "immersion" test in demineralized water for 30 min (initial and immersed, baked and immersed).

The object of these 2 tests is obviously to find out the permanency of the treatment.

2* Measurement of the angle and its change over time (0 to 60 econds) in contact with reference liquids (water and $CH_2I_2$).

Although it is easy to do, we did not recalculate the surface energy of the deposits or its change. The angle between the test liquid and the surface is in fact sufficient as far as the oleophobicity and hydrophobicity properties are concerned.

The experiments were performed on the following products: the grafted POS of Example VIII, FC 396 and the untreated PA66 control.

XII.1.2 Results

Table 6 shows the angles obtained after 60 seconds.

TABLE 6

Change in the angles of test liquids on treated or untreated surfaces

| Sample | Control | POS VIII | FC 396 |
|---|---|---|---|
| Initial | | | |
| $H_2O$ | 50° | 80° | 100° |
| $CH_2I_2$ | 30° | 90° | 50° |
| Baked | | | |
| $H_2O$ | 50° | 100° | 110° or 75° |
| $CH_2I_2$ | 50° | 80° | 50° |
| Initial and washed | | | |
| $H_2O$ | | | 103° |
| $CH_2I_2$ | | | 45° |
| Baked and washed | | | |
| $H_2O$ | | 110° | 110° or 80° |
| $CH_2I_2$ | | 55° | 60° |
| Initial and immersed | | | |
| $H_2O$ | | | 112° |
| $CH_2I_2$ | | | 50° |
| Baked and immersed | | | |
| $H_2O$ | | | 112° |
| $CH_2I_2$ | | | 60° or 90° |

What is claimed is:

1. A halogenated polyorganosiloxane of formula (I) or formula (II):

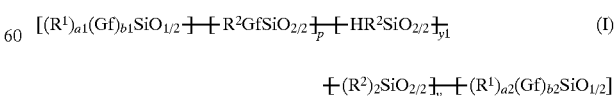

(I)

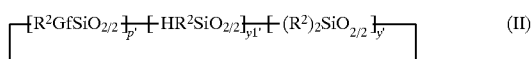

(II)

wherein in formulae (I) and (II)

(1) a1+b1=3, a2+b2=3, a1=2 or 3, a2=2 or 3 b1=0 or 1, b2=0 or 1, $1 \leq p \leq 200$, $0 \leq y_1 \leq 10$, $0 \leq y \leq 100$, $5 \leq p+y_1+y \leq 200$, $[p/(p+y+y_1+2)]0.100 \geq 3$, $1 \leq p' \leq 9$, $0 \leq y'_1 \leq 1$, $0 \leq y' \leq 5$, $p'+y_1'+y' \geq 3$; and (2) each $R^1$ and $R^2$, which may be identical or different from other $R^1$ and $R^2$, are a linear or branched $C_1$ to $C_{12}$ cycloalkyl group or a hydrocarbon group;

(3) Gf is a monovalent radical having the formula (III)

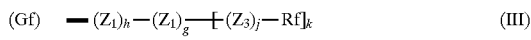    (III)

wherein in formula III (a) h=0 or 1, g=0 or 1, j=0 or 1, and k=1 or 2;

(b) — illustrates a free valence attached directly or indirectly to the silicon;

(c) at least one radical Gf is present wherein k≠o is present in said POS (I) or (II);

(d) $Z_1$ is a divalent radical of formula (IV)

    (IV)

wherein formula (IV) $m \geq 2$ with the proviso that if m=2, then in at least some radicals Gf, g≠0;

(e) $Z_2$ is a mono-, di- or tri-valent radical having one of the formulae (V) to (XII)

    (V)

wherein formula (V) at least one of the free valences of the carboxyl groups is joined to —$Z_3$Rf and, in the case where only one of the free valences is joined to —$Z_3$Rf, the other free valence is joined to a hydroxyl;

    (VI)

wherein formula (VI) at least one of the free valences of the carboxyls is joined to —$Z_3$Rf and, in the case where only one of the free valences is joined to —$Z_3$Rf, the other free valence is joined to a linear or branched $C_1$–$C_6$ alkoxy and $R_a$ is a hydrogen, aryl or linear or branched $C_1$–$C_6$ alkyl radical;

    (VII)

    (VIII)

    (IX)

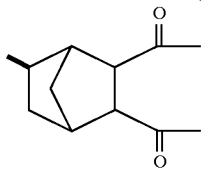    (X)

wherein formula (X), h=0, at least one of the free valences of the carboxyl(s) is joined to —$Z_3$Rf and, in the case where only one of the free valences is joined to —$Z_3$Rf, the other is joined to a hydroxyl group or to a linear or branched $C_1$–$C_6$ alkoxy radical;

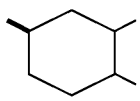    (XI)

wherein formula (XI) at least one of the two free valences other than the valence — is joined to —$Z_3$Rf and, in the case where only one of the two valences is joined to —$Z_3$Rf, the other is joined to OH or to a linear or branched $C_1$–$C_6$ alkoxy group;

    (XII)

wherein formula (XII) at least one of the two free valences other than the valence — is joined to —$Z_3$Rf and, in the case where only one of these two valences is joined to —$Z_3$Rf, the other valence is joined to a hydroxyl group or to a linear or branched $C_1$–$C_6$-alkoxy group, and $R^b$=H or a linear or branched $C_1$–$C_6$-lower alkyl;

wherein formulae (V), (VII), (VIII), and (IX), W is a cyclic or non-cyclic hydrocarbon radical devoid of an ether link -o-; and (f) $Z_3$ is a divalent radical of the formula (XIII)

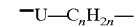    (XIII)

wherein formula (XIII) $n \geq 1$ and U is an O, S, NH or $NHSO_2$; and (g) Rf is a perhalogenated radical.

2. The halogenated polyorganosiloxane according to claim 1, wherein $1 \leq p \leq 90$, $0 \leq y_1 \leq 5$, $0 \leq y \leq 50$, $10 \leq p+y_1+y \leq 100$, $[p/(p+y+y_1+2)]0.100 \geq 5$.

3. The halogenated polyorganosiloxane according to claim 1, wherein at least one $R^1$ or $R^2$ is a substituted or unsubstituted aryl, aralkyl or alkylaryl group.

4. The halogenated polyorganosiloxane according to claim 1, wherein at least one hydrogen substituting the carbons of $Z_1$ is substituted with a linear or branched $C_1$–$C_6$ alkyl group.

5. The halogenated polyorganosiloxane according to claim 1, wherein Rf is perfluorinated.

6. The halogenated polyorganosiloxane according to claim 5, wherein Rf is a linear or branched perfluoroalkyl radical having one of the formulae:

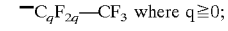 where $q \geq 0$;

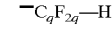

where $q \geq 1$;

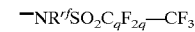

where $q \geq 0$ and $R^{rf}$=H, aryl or linear or branched $C_1$–$C_6$ alkyl;

$$-NR^{rf}SO_2C_qF_{2q}-H$$

where $q \geq 1$ and $R^{rf}$=H, aryl or linear or branched $C_1$–$C_6$ alkyl.

7. A halogenated polyorganosiloxane according to claim 1 of formula (I.1):

$$[(R^1)_{c1}(H)_{d1}SiO_{1/2}\text{---}\{R^2(Gf_1)SiO_{2/2}\}_{p_1}\text{---}\{R^2(Gf_2)SiO_{2/2}\}_{p_2}\text{---}\{HR^2SiO_{2/2}\}_{y_1}\text{-----}$$

$$\text{-----}\{(R^2)_2-SiO_{2/2}\}\text{---}\{(R^1)_{c2}(H)_{d2}-SiO_{1/2}]} \quad (I.1)$$

where
- $R^1$ is a methyl, propyl or butyl group; $R^2$ is a methyl, propyl or butyl group;
- $c1+d1=3$
- $c2+d2=3$;
- $p_1$ and $p_2 \geq 0$; $p_1=p_2 \geq 1$;
- $0 \leq y_1 \leq 100$, with the proviso that if $y_1=0$, then d1 and/or d2=1;
- $0 \leq y \leq 500$;
- h=1, k=1, g=0, j=0;
- $Gf_1$=Gf, where h=k=1 and g=j=0;
- $Gf_2$=Gf, where h=g=1 and k=1 or 2;

and $Z_2$ is $$-CH-CO- \quad \text{or} \quad -CH-CO-.$$
$$\;\;\;|\qquad\qquad\qquad\quad\;\;|$$
$$\text{COOH}\qquad\qquad\;\;\;\text{CO}$$
$$\qquad\qquad\qquad\qquad\quad\;|$$

8. The halogenated polyorganosiloxane according to claim 7, wherein c1=2, d1=1, c2=2 and d2=1; and $0 \leq y \leq 100$.

9. The halogenated polyorganosiloxane according to claim 8 of formula (I.1.1):

$$\begin{array}{c}CH_3\;\;\;CH_3\;\;\;CH_3\;\;\;CH_3\qquad\;\;\;CH_3\\|\qquad\;\;|\qquad\;\;|\qquad\;\;|\qquad\qquad\;\;|\\R^\alpha SiO-(SiO)_y-(Si)_{y_1}-(SiO)_{p_1+p_2}-SiR^\omega\\|\qquad\;\;|\qquad\;\;|\qquad\;\;|\qquad\qquad\;\;|\\CH_3\;\;\;CH_3\;\;\;H\qquad\;Gf\qquad\;\;\;CH_3\end{array} \quad (I.1.1)$$

where $R^\alpha$ and $R^\omega$, which are identical or different, are H or $C_1$–$C_6$-alkyl radical.

10. The halogenated polyorganosiloxane according to claim 1 which comprises at least one species (a) and/or (b) substituted by at least one perhalogenated radical Gf having one of the following formulae:

$$-CHR^9-(CH_2)_i-CR^a\begin{array}{c}\;\;\;O\\\;\;\;\|\\\diagup C-R^{10}\\\\\diagdown C-R^{11}\\\;\;\;\|\\\;\;\;O\end{array}$$

where $R^a$ and $R^9$ independently are H or linear or branched $C_1$–$C_6$ alkyl radical;
$R^{10}$ and $R^{11}$ independently are OH, linear or branched $C_1$–$C_6$-alkoxy radical or $-Z_3Rf$, at least one of the radicals $R^{10}$ and $R^{11}$ being $-Z_3Rf$; and i=0 to 10;

$$-CHR^9-(CH_2)_i-SiR^a\begin{array}{c}\diagup R^{10}\\\\\diagdown R^{11}\end{array}$$

where $R^9$, $R^a$, $R^{10}$, $R^{11}$ and i are as defined above;

$$-CHR^9-(CH_2)_i-\left\langle\begin{array}{c}R^{10}\\\\R^{11}\end{array}\right.$$

where $R^9$, $R^{10}$, $R^{11}$ and i are as defined above, it optionally being possible for the hexyl ring to be substituted.

11. A halogenated polyorganosiloxane according to claim 10, wherein at least one radical $R^{10}$ and $R^{11}$ is $$-O-C_nH_{2n}-C_qF_{2q}-CF_3 \;_{(q \geq 0)}$$

or $$-O-C_nH_{2n}-C_qF_{2q}-H \;_{(q \geq 1)}.$$

12. A halogenated polyorganosiloxane according to claim 1, which also comprises $-[R^8-SiO_{3/2}]-$ units, where the radicals $R^8$ of the different units are identical or different and are defined in the same way as $R^1$, $R^2$ and Gf.

13. A process for the preparation of a halogenated polyorganosiloxane according to claim 1 comprising reacting at least one polyalkylhydrogenosiloxane with at least one halogenated olefin in the presence of an effective amount of a metal hydrosilylation catalyst.

14. The process according to claim 13, wherein said halogenated olefin is a fluorinated olefin.

15. The process according to claim 13, wherein said catalyst comprises platinum.

16. The process according to claim 13, wherein said polyalkylhydrogenosiloxane is polymethylhydrogenosiloxane.

17. A process for the preparation of a halogenated polyorganosiloxane according to claim 1, comprising reacting at least one polyalkylhydrogenosiloxane oil with (1) at least one halogenated olefin which is a precursor of Gf and has the formula:

$$Z_{1P}Rf$$

wherein $Z_{1P}$ is an olefinic precursor of $Z_1$ and m is 2;

(2) at least one olefin of the formula $$Z_{1P}Z_{2P}$$

wherein $Z_{1P}$ is an olefinic precursor of $Z_1$ and $Z_{2P}$ is a precursor of $Z_2$; and/or (3) at least one halogenated olefin having the formula $$Z_{1P}Rf$$

wherein $Z_{1P}$ is an olefinic precursor of $Z_1$ and m>2; in the presence of a metal hydrosilylation catalyst.

18. The process according to claim 17, wherein said catalyst comprises cobalt, platinum or both cobalt and platinum.

19. The process according to claim 17, wherein the reaction product obtained is brought into contact with $$Z_{3P}Rf$$

to obtain one or more radicals Gf, wherein $Z_{3P}$ is a precursor of $Z_3$.

20. The process according to claim 17, wherein said oil is reacted with at least one olefin of the formula $$Z_{1p}Z_{2p},$$

wherein $Z_{1p}$ is an olefinic precursor of $Z_1$ and $Z_{2p}$ is an olefinic precursor of $Z_2$, in the presence of an effective amount of a metal hydrosilylation catalyst to form one or more radicals Gf.

21. The process according to claim 20, wherein said catalyst comprises platinum.

22. The process according to claim 20, wherein said reactants are further brought into contact with $$Z_{3p}Rf$$

to obtain one or more radicals Gf, wherein $Z_{3p}$ is a precursor of $Z_3$.

23. A process for the preparation of cyclic or linear halogenated polyorgano-siloxane according to claim 1, comprising reacting at least one polyalkylhydrogenosiloxane oil with at least one halogenated olefin which is a precursor of Gf and has the formula:

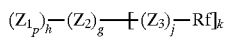

wherein $Z_{1_p}$ is the olefinic precursor of the radical $Z_1$ and with the provisos that if h=0, then g=1 and $Z_2$ becomes an olefinic precursor $Z_{2p}$, and if k=h=1 and m=2, then g=1 and $Z_2=Z_{2p}$;

in the presence of an effective amount of a metal hydrosilylation catalyst preferably based on platinum.

24. The process according to claim 23, wherein the precursor of Gf has one of the following formulae:

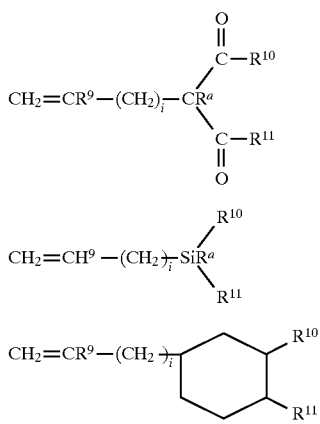

wherein the above formulae $R^a$ and $R^9$ independently are H or linear or branched $C_1$–$C_6$-lower alkyl; $R^{10}$ and $R^{11}$ independently are OH, linear or branched $C_1$–$C_6$-alkoxy or —$Z_3$Rf, at least one of the radicals $R^{10}$ and $R^{11}$ being —$Z_3$Rf; the hexyl ring is optionally substituted; and i=0 to 10.

25. A process according to claim 24, wherein the precursors of Gf are obtained by transesterification of at least one compound having a mobile hydrogen, consisting of the hydrogenated radical $Z_3$Rf, with starting materials formed by compounds of the formula (ip), (iip) or (iiip), in which the precursors have one or two perfluorinated groups $R^{10}$ and $R^{11}$, wherein $R^{10}$ and/or $R^{11}$=$Z_3$Rf, and at least one of the radicals $R^{10}$ and $R^{11}$ is a linear or branched $C_1$–$C_6$-alkoxy.

26. The process according to claim 24, wherein the precursors of the grafts Gf have one or two perfluorinated groups.

27. A reaction intermediate capable of use in the process according to claim 23 having at least one of the following formulae:

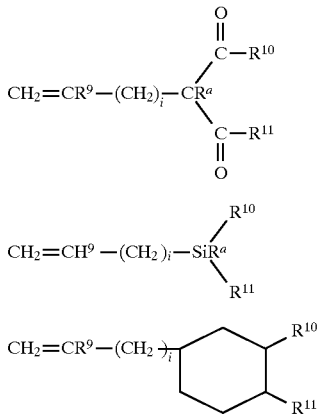

wherein the above formula $R^a$ and $R^9$ independently are H or linear or branched $C_1$–$C_6$-lower alkyl; and at least one of the radicals $R^{10}$ and $R^{11}$ corresponds to a linear or branched $C_1$–$C_6$-alkoxy group.

28. The process according to claim 17, wherein at least some of the precursors of $Z_2$ grafted to the oil are acid anhydride groups, at least some of the anhydride groups are hydrolyzed so as to generate free carboxyl ends, and at least some of said carboxyl ends are esterified with reactants of the type —$Z_{3p}$Rf, $Z_{3p}$ being a precursor of $Z_3$.

29. The process according to claim 13, wherein the reaction between the radicals $Z_{2p}$ and $Z_{3p}$ is an esterification.

30. An aqueous emulsion which contains at least one POS according to claim 1 and at least one surfactant.

31. An antifoam, lubricant, anti-adhesive agent for lowering surface tension, dirt repellent, oleophobic and/or hydrophobic agent or elastomer or film for resisting chemical attack comprising the halogenated polyorganosiloxane defined in claim 1.

32. A dirt-repelling composition comprising at least one halogenated polyorganosiloxane as defined in claim 1.

* * * * *